(12) United States Patent
Jansson et al.

(10) Patent No.: US 12,206,977 B2
(45) Date of Patent: Jan. 21, 2025

(54) PREDICTIVE CAMERA CONTROL FOR TRACKING AN OBJECT IN MOTION

(71) Applicant: Topgolf Sweden AB, Danderyd (SE)

(72) Inventors: Ludvig Wilhelm Jansson, Stockholm (SE); Daniel Forsgren, Enebyberg (SE)

(73) Assignee: Topgolf Sweden AB, Danderyd (SE)

( * ) Notice: Subject to any disclaimer, the term of this patent is extended or adjusted under 35 U.S.C. 154(b) by 127 days.

(21) Appl. No.: 18/084,446

(22) Filed: Dec. 19, 2022

(65) Prior Publication Data

US 2023/0199295 A1 Jun. 22, 2023

Related U.S. Application Data

(60) Provisional application No. 63/292,379, filed on Dec. 21, 2021.

(51) Int. Cl.
| | |
|---|---|
| H04N 23/61 | (2023.01) |
| G01S 13/86 | (2006.01) |
| G06T 7/20 | (2017.01) |
| G06T 7/70 | (2017.01) |
| G06V 20/50 | (2022.01) |
| H04N 13/204 | (2018.01) |
| H04N 23/67 | (2023.01) |

(Continued)

(52) U.S. Cl.
CPC ............. *H04N 23/61* (2023.01); *G06T 7/20* (2013.01); *G06T 7/70* (2017.01); *G06V 20/50* (2022.01); *H04N 13/204* (2018.05); *H04N 23/675* (2023.01); *H04N 23/69* (2023.01); *H04N 23/695* (2023.01); *G01S 13/867* (2013.01); *G06T 2207/10012* (2013.01); *G06T 2207/30224* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 5,342,051 A | * | 8/1994 | Rankin .............. A63B 24/0021 473/409 |
| 6,774,932 B1 | | 8/2004 | Ewing et al. |

(Continued)

FOREIGN PATENT DOCUMENTS

| | | |
|---|---|---|
| WO | WO 2021148497 | 7/2021 |
| WO | WO 2022096353 | 5/2022 |

OTHER PUBLICATIONS

International Search Report and Written Opinion in International Appln. No. PCT/EP2022/086970, mailed on Apr. 18, 2023, 13 pages.

*Primary Examiner* — Edemio Navas, Jr.
(74) *Attorney, Agent, or Firm* — Fish & Richardson P.C.

(57) ABSTRACT

Methods, systems, and apparatus, including medium-encoded computer program products, for tracking an object in motion includes, in at least one aspect, a method including: detecting a launch of a ball based on initial data obtained by one or more sensors, sending initial control signals that begin changing at least one of pan, tilt, or zoom for a camera based on a predicted future position of the ball, determining a trajectory of the ball in three-dimensional space based on additional data obtained by the one or more sensors after the launch, and sending additional control signals that control each of the pan, tilt, and zoom for the camera based on an expected future position of the ball along the trajectory.

24 Claims, 3 Drawing Sheets

(51) Int. Cl.
*H04N 23/69* (2023.01)
*H04N 23/695* (2023.01)

(56) References Cited

U.S. PATENT DOCUMENTS

| | | |
|---|---|---|
| 9,185,361 B2 | 11/2015 | Curry |
| 9,498,678 B2 | 11/2016 | Cronin et al. |
| 9,684,056 B2 | 6/2017 | Khanfor |
| 10,237,465 B2 | 3/2019 | Chan |
| 10,338,209 B2 | 7/2019 | Johnson |
| 10,596,416 B2 | 3/2020 | Forsgren |
| 10,632,359 B2 | 4/2020 | Spivak et al. |
| 11,003,914 B2 | 5/2021 | Imes |
| 2016/0048975 A9 | 2/2016 | Tuxen et al. |
| 2016/0322078 A1* | 11/2016 | Bose ................ G01P 13/00 |
| 2016/0379682 A1* | 12/2016 | Williams ........... H04N 21/4728 |
| | | 386/278 |
| 2018/0290041 A1* | 10/2018 | Vollbrecht ......... G09B 19/0038 |
| 2021/0033722 A1 | 2/2021 | Sondergaard et al. |
| 2021/0220718 A1* | 7/2021 | Tuxen ................ A63B 71/0622 |
| 2022/0284628 A1 | 9/2022 | Tuxen et al. |

* cited by examiner

PREDICTIVE CAMERA CONTROL FOR TRACKING AN OBJECT IN MOTION

CROSS-REFERENCE TO RELATED APPLICATIONS

This application claims the benefit under 35 U.S.C. § 119(e) of U.S. Patent Application No. 63/292,379, entitled "PREDICTIVE CAMERA CONTROL FOR TRACKING AN OBJECT IN MOTION", filed Dec. 21, 2021.

BACKGROUND

This specification relates to camera control, such as controlling a camera viewing a golf ball that is tracked in flight through a three-dimensional space.

Sporting events are frequently filmed for broadcast, typically with cameras that are controlled by people. Further, pan-tilt-zoom (PTZ) cameras have been used for live streaming of events, and some have proposed automating the control of such cameras. For example, U.S. Pat. No. 9,498,678 describes a ball tracking system that triangulates the position of a ball (in play on a field) using wireless signals received from the ball to determine the "real-time location" of the ball, and this information is provided to a camera with an "automatic gimbal" such that the camera "may be able to automatically follow the ball" in real-time.

SUMMARY

This specification describes technologies relating to tracking an object in motion, such as a golf ball in flight, using data obtained from one or more sensor units.

In general, one or more aspects of the subject matter described in this specification can be embodied in one or more systems that include: a first sub-system including a camera and motors configured and arranged to adjust pan, tilt, and zoom for the camera; and a second sub-system including one or more sensors and one or more data processing apparatus configured to detect a launch of a ball based on initial data obtained by the one or more sensors, send initial control signals that cause at least one of the motors of the first sub-system to begin changing at least one of pan, tilt, or zoom for the camera based on a predicted future position of the ball, determine a trajectory of the ball in three-dimensional space based on additional data obtained by the one or more sensors after the launch, and send additional control signals that cause the motors of the first sub-system to control each of the pan, tilt, and zoom for the camera based on an expected future position of the ball along the trajectory.

The camera of the first sub-system can be a broadcast camera, the motors of the first sub-system can include an actuator configured and arranged to adjust focus for the camera, and the one or more data processing apparatus of the second sub-system can be configured to: send further control signals that cause the actuator of the first sub-system to control the focus for the camera based on a current position of the ball along the trajectory.

The one or more data processing apparatus of the second sub-system can be configured to: process image data from the broadcast camera to identify the ball in the image data; and send further control signals that cause the motors of the first sub-system to control each of the pan, tilt, and zoom for the camera to stay on the ball in real-time based on the ball being identified in the processed image data from the broadcast camera. The one or more sensors of the second sub-system can include a radar device. The one or more sensors of the second sub-system can include a stereo camera. The one or more sensors of the second sub-system can include a radar device and a camera.

The second sub-system can include a launch monitor that provides the initial data and a ball tracker that provides the additional data. The first sub-system can be separate and distinct from the second sub-system. The one or more sensors of the second sub-system can include two sensors, which include the camera of the first sub-system. The first and second sub-systems can be integrated with each other, e.g., into a single unit, and a same camera can be used for tracking the ball and for showing the ball in flight, e.g., by broadcast of the same camera images being used for ball tracking. The ball can be a golf ball. The ball can be a baseball. The ball can be a cricket ball. The ball can be an American football. The ball can be a soccer ball. Other embodiments include corresponding apparatus, methods and computer program products recorded on one or more computer storage devices, that perform actions specified for the system(s).

In addition, one or more aspects of the subject matter described in this specification can be embodied in one or more methods that include: detecting a launch of a ball based on initial data obtained by one or more sensors; sending initial control signals that change at least one of pan, tilt, or zoom for a camera based on a predicted future position of the ball; determining a trajectory of the ball in three-dimensional space based on additional data obtained by the one or more sensors after the launch; and sending additional control signals that control each of the pan, tilt, and zoom for the camera based on an expected future position of the ball along the trajectory.

The method operations can include extrapolating a path of the ball based on the initial data to predict the future position of the ball after the launch. The camera can be a broadcast camera, and the method operations can include processing image data from the broadcast camera to identify the ball in the image data; and sending further control signals that control each of the pan, tilt, and zoom for the camera to stay on the ball in real-time based on the ball being identified in the processed image data from the broadcast camera. Moreover, the camera can be a high resolution broadcast camera, and the pan, tilt, and zoom for the camera can be virtual pan, tilt, and zoom.

Various embodiments of the subject matter described in this specification can be implemented to realize one or more of the following advantages. The latency between an object tracking system and an imaging system for the object being tracked can be effectively reduced or eliminated by predicting where the object is headed in three-dimensional space. Sensor data from a ball tracking system can indicate a trajectory for the ball in three-dimensional space, and this indicated trajectory can be used to control the pan, tilt and zoom of a camera, which can be separate from the ball tracking system, and optionally additional control parameters/settings for the camera, such as camera focal length and iris control. The camera control can initially begin using ball launch data, and then the control can switch over to using an extrapolated trajectory, which can become more accurate as more data is received by the ball tracking system.

A broadcast camera can be controlled so as to stay ahead of the object in flight, even when traveling very quickly (e.g., 273-322 kilometers per hour upon launch). Thus, high quality video images of an object in flight, with smooth movements for the camera and close ups of the object, can be achieved even when the object in flight is small, fast and travels a long distance. This improvement in broadcast camera operation can be achieved while simultaneously reducing the production costs associated with broadcasting a live sporting event, e.g., because the broadcast camera is controlled automatically without a cameraman.

A broadcast camera system and an object tracking system (e.g., for golf) can be integrated in a manner that enables automatic control of the broadcast camera from launch (at a point in time when the broadcast camera may not provide data usable for locating the object) through to the object coming to rest on the ground (at a point in time when the object tracking sensor system may not provide data usable for locating the object). Moreover, the data used for the automatic control of the broadcast camera can also be used for other purposes. For example, the predicted trajectory can be used to superimpose various graphics on the images from the broadcast camera, such as graphics that show shot statistics information placed at specific points along the predicted trajectory, ahead of the ball.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
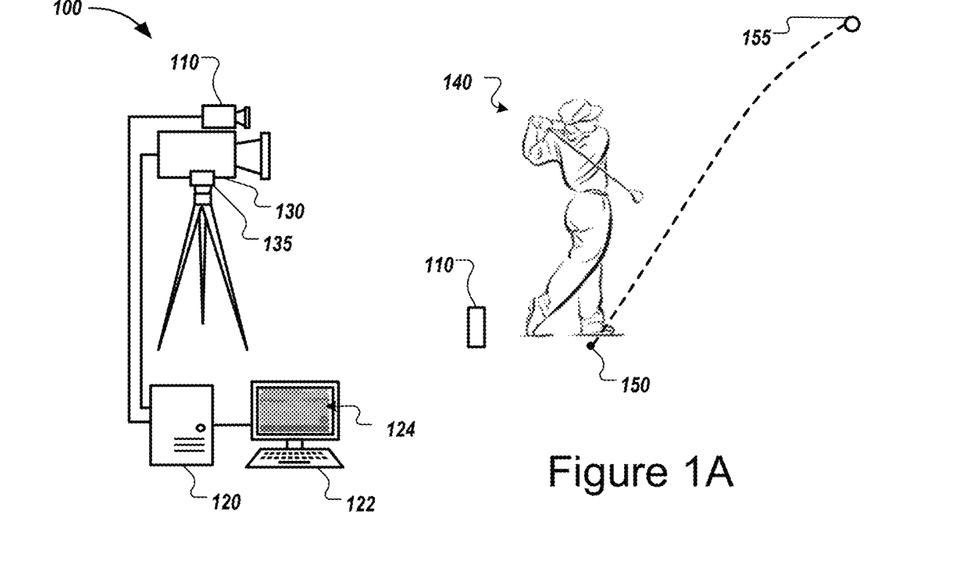
FIG. 1A shows an example of a system that performs three-dimensional (3D) object tracking of an object in motion through a three-dimensional space.

FIG. 1A shows an example of a system 100 that performs three-dimensional (3D) object tracking of an object in motion through a 3D space. The object to be tracked can be a golf ball or another type of object that is launched in some manner, such as by being struck, kicked or thrown (e.g., a baseball, a soccer ball, or a football/rugby ball). In some implementations, the 3D space is a golf range, a grass field, or another open area into which objects can be launched. For example, the 3D space can be part of a golf entertainment facility that includes one or more targets, a building including golf bays, each including at least one tee area, and potentially other entertainment as well as dining options. In some implementations, the 3D space is a playing area for a sport, such as a golf course, where the launch area can be the golf tee for a particular hole on the golf course, or an intermediate landing point for a golf ball in play on the course, and the target can be the cup at the end of the particular hole on the golf course or an intermediate landing point for a golf ball in play on the course. Other implementations are also possible, such as the launch area being one of multiple designated tee areas along a tee line where golfers can hit golf balls into an open field, or the launch area being one of multiple designated tee areas in the stands at a sports stadium where golfers can hit golf balls over and onto the playing field of the sports stadium.

The system 100 includes one or more sensor units 110 communicatively coupled with one or more server computers 120, one or more personal computers 122, or a combination of these. The sensor unit(s) 110 can include one or more cameras (e.g., a stereo camera), one or more radar devices, or a combination of these. The sensor unit(s) 110 can be located close to the launch area for the object to be tracked, but this need not be the case. In some implementations, one or more of the sensor units 110 are located along a fairway and/or at the green where the target is located. In addition, although represented using physical wires/cables in FIG. 1, it will be appreciated that the communicative coupling between the sensor unit(s) 110 and the associated computer(s) 120, 122 can be implemented using wireless technologies, such as near field communications (NFC), Bluetooth, WiFi, and/or one or more mobile phone technologies.

In some implementations, one or more hybrid camera-radar sensor units, as described in U.S. Pat. No. 10,596,416, issued on Mar. 24, 2020, can be employed in the system 100. In some implementation, one or more of the systems and techniques described in PCT/EP2021/079919 Application, filed on 12 Oct. 2021, published as WO2022/096353 on 12 May 2022, and titled "THREE-DIMENSIONAL OBJECT TRACKING USING UNVERIFIED DETECTIONS REGISTERED BY ONE OR MORE SENSORS", can be employed in the system 100. Other sensor and computer configurations are also possible, such as a radar device that is used in combination with one or more cameras (e.g., a 2D tracking camera or a 3D tracking stereo camera). For example, the sensor unit(s) 110 can include a launch monitor 110 (e.g., a radar device with a local processor configured to detect a ball launch) located next to a golfer 140 (e.g., within one meter of the golfer 140), and a ball tracker 110 (e.g., a stereo camera, with a either a narrow baseline of less than one meter or a wide baseline of more than one meter, and an associated processor configured to determine a ball trajectory in 3D space) located a substantial distance away (e.g., more than two meters) from the golfer 140, as well as potentially a substantial distance away (e.g., more than two meters) from a camera 130. Note that linking the output of two cameras 110 (separate from a broadcast camera 130) to form a stereo camera pair in proximity to a starting position 150 (e.g., the golf tee) can provide full 3D information about anything around the starting position 150, including for example, where the players, caddies, golf bags, etc. are located in relation to ball's path and the trace of the ball to be overlaid on the image data, and also provide high accuracy for the start of the ball path, thereby providing an initial ball path estimate that will be very close to the real ball trajectory. Nonetheless, in some implementations, the camera 130 (e.g., a broadcast camera 130) can be used in conjunction with the one or more sensors of the sensor unit(s) 110 to form a sensor "unit", such as being used with a camera in a ball tracker to form a stereo camera sensor, or being used with a radar device in the launch monitor to form a hybrid camera-radar sensor.

But regardless of the sensor and computer configuration used in a first sub-system of the system 100, a second sub-system of the system 100 includes the camera 130 and motors 135 configured and arranged to adjust at least pan, tilt, and zoom for the camera 130.

The camera 130 can be oriented toward the golfer 140 who will hit a golf ball 155 from the starting position 150 into a flight path in the direction of a target (e.g., the hole on a golf course). In some implementations, the motors 135 are also configured and arranged to adjust focal length and iris of one or more lenses of the camera 130. Note that while the motors 135 are shown in the Figure as residing below the camera 130, for ease of presentation, the motors 135 can be located in various places within the camera 130 in various implementations. For example, the motors that control focal length, focus, and iris of a camera can be located inside the lens of the camera, regardless of whether the lens is an external lens or an integrated lens.

In addition, various communication systems and techniques can be used to control the motors 135. For example, in the case of an external lens, the control signals for focal length, focus, and iris can be sent to the motors via a serial port on the lens itself and be communicated over RS232 or RS422 protocols for these camera parameters, and the control signals for pan and tilt can be sent to the motors via a network or Near-Field Communication (NFC) channel and be communicated using various types of protocols (e.g., Ethernet, WiFi, or Cellular phone communication protocols). In the case of an integrated lens, the control signals for pan, tilt, focal length, focus, and iris can be sent to the motors via an Application Programming Interface (API) provided by the camera manufacturer, or customized software designed to communicate with the motors of the camera over the camera manufacturer's communication protocol.

The camera 130 can be a television (TV) camera adapted to produce a signal for live transmission and/or for recording, and the system 100 can be designed to translate ball positions registered by the sensor unit 110 to corresponding positions in video data obtained by the additional camera 130, and using this translation, a graphical representation of the ball's flight path can be overlaid onto the video data for transmission and/or recording. For example, in the case of a golf competition TV broadcast, where the system 100 can be used to track golf balls through the 3D space of the golf course and overlay a trace of the golf ball in a TV signal produced for live transmission, or for recording, the sensor(s) 110 and camera 130 may be deployed a mile or more from the TV production facilities (where a 3D tracking computer may be positioned).

Note that the translation of ball positions (identified during the 3D tracking) to corresponding positions in video data obtained by the TV camera (allowing the trace overlay of a graphical representation of the ball's flight path onto the video data) can be performed using known homography techniques. In some implementations, in order to match the second sub-system (including the camera 130) with the first sub-system (including the sensor unit(s) 110) the systems and techniques described in U.S. Pat. No. 6,774,932, issued on Aug. 10, 2004, can be used to achieve registration of the data from the first sub-system with video images from the second sub-system. Other approaches for data registration between the two sub-systems are also possible.

The trace overlay can highlight the ball itself and/or the trajectory of the ball in flight. For example, the ball's trajectory can be highlighted with a ribbon of color overlaid onto the video image data as the ball flies through the air, so the viewer can readily see the entire arc of the ball's flight as the ball travels to its destination. Also, the ball itself can be highlighted at its current location using various types of overlaid graphics, such as by adding color to make the ball glow or appear larger or more solid, drawing contours around the ball, giving the ball a comet's tail, using a camera shutter effect (making the ball appear to be multiple balls in the broadcast image), etc.

Further, the trace overlay of a graphical representation of the ball's flight path onto the video data need not be limited to showing where the ball currently is and where it has been, but can also include superimposing various graphics on the images from the camera at locations ahead of the current ball position. For example, a graphical representation of the predicted ball trajectory can be overlaid on the video image data from a broadcast camera. Additionally or alternatively, graphics that show shot statistics information can be placed at specific points in the camera image, e.g., along the actual and/or predicted ball trajectory, where those points correspond to locations in 3D space for which the shot statistics information is relevant.

For example, a graphic showing ball speed at launch information can be placed in the video image at a point (in the 2D camera image frame) that is adjacent to the launch location (in 3D space), a graphic showing highest point information for the ball can be placed at the apex of the ball's trajectory, a graphic showing carry distance information can be placed at the first landing location of the ball, and a graphic showing rollout distance can be placed at the final resting location of the ball. Note that these graphics can be updated (both in terms of location and the information being shown) as the ball is in flight. For example, shortly after launch, the predicted trajectory can be superimposed on the camera's image data being broadcast, along with a predicted maximum ball height (e.g., 21 meters) adjacent to a predicted apex, a predicted carry distance (e.g., 201 meters) adjacent to a predicted first landing location, and a predicted rollout distance (e.g., 14 meters) adjacent to a predicted final resting location.

Then, as the sensor 110 receives more data and the prediction is updated, the graphics can likewise be updated to show the newly predicted locations and values, and once the predicted locations and values become actual locations and values (i.e., as the ball reaches its apex, then hits the ground, and then comes to rest) the graphics can be changed (e.g., in color or framing) to indicate the predicted location and value has now settled on the actual location and value. Further, in some implementations, predictive zones and/or ranges can be used instead of specific locations and/or values in the superimposed graphics. For example, a circle graphic in 3D space (which will typically be seen as an ellipsis in the 2D camera frame) can be used to graphically show a range of 3D locations for the predicted apex of ball's flight (the circle in 3D space being centered on, and perpendicular to, the predicted trajectory) and/or to graphically show a range of 3D locations where the ball is predicted to land (the circle in 3D space being centered on the predicted landing location and being located on the ground plane) in the broadcast camera image frame, and such circles can then be shrunk in the video image data being broadcast as the prediction becomes more and more accurate, until the final value is known and can be shown in the broadcast image.

Moreover, 3D ball positions determined using the sensor unit(s) 110 can be used to augment other data or media. For example, the determined 3D ball positions can be used to generate a 3D representation of the ball's flight path within a 3D computer model 124 of an environment for the golf ball 155. This environment can be a representation of the actual, physical environment that the golfer 140 stands in (e.g., a particular hole on a particular golf course) or the environment can be a virtual environment that exists only in the computer model 124. In any case, the one or more sensor unit(s) 110 can provide data that is processed for use in controlling the motors 135 of the camera 130 as described in this application.

Figure 1B:
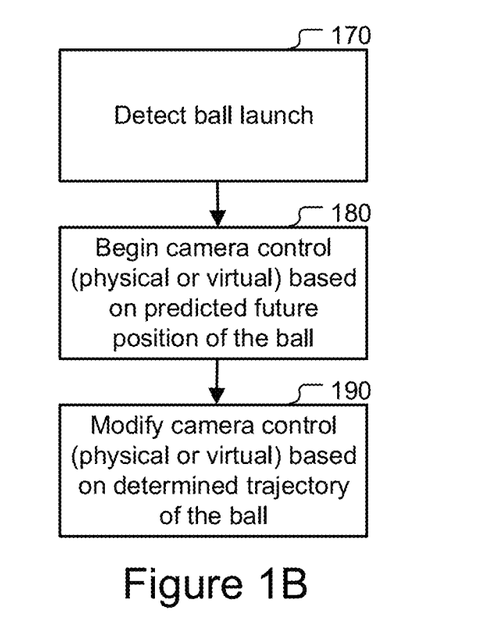
FIG. 1B shows an example of a process of controlling a camera based on launch detection and trajectory determination.

FIG. 1B shows an example of a process of controlling a camera based on launch detection and trajectory determination. A ball launch is detected 170 (e.g., by computer 120, computer 122, or both). Detection of a ball launch can happen very quickly after the actual event (e.g., within milliseconds). In some implementations, as soon as a ball launch is detected 170, motion of the camera in view of the ball launch is initiated.

Control of the camera is begun 180 (e.g., by computer 120, computer 122, or both) to adjust one or more of the camera settings based on a predicted future position of the ball that was launched. This can involve sending signals to one or more motors 135 of the camera 130 to change one or more of pan, tilt, zoom, focus, and iris of the camera 130, i.e., physical camera control, and/or this can involve performing digital processing of image data from a high-resolution camera, i.e., virtual camera control. Note that object tracking is delayed by some amount, such that, once a position in three-dimensional space is determined, the object is no longer at that 3D position. For fast moving objects, such as golf balls immediately after launch, the difference between the currently determined location and its actual location at the same point in time can be substantial. Thus, in order to not have the camera 130 merely follow the tracked path of the object in flight, a prediction (e.g., an extrapolation of a determined trajectory) is made as to where the object is going, and the camera 130 is controlled based on this prediction so as to stay on or ahead of the object. For example, in the case of a golf ball launch, which can have an initial speed of 273 kilometers per hour or more, the initial prediction of where the ball is going is needed in order to get the camera 130 moving quickly enough to stay ahead of (or on) the ball in flight.

In some implementations, the camera motion can begin 180 even before a track of the ball has been detected. For example, initiation of camera movement can be performed in accordance with the fact that a ball launch has occurred and the limited number of options for where there ball can go in view of the position and initial orientation of the camera 130 with respect to the starting position 150. Thus, movement of the camera 130 can begin as soon as a ball launch is detected, based on pre-determined parameters concerning the most likely path the ball will take, e.g., based on a set of probable trajectories for the launched ball.

In such implementations, once a ball track is identified and a path for the ball can be extrapolated, the camera control can take account of the extrapolated path, as described in further detail below in connection with FIG. 3. For example, the extrapolated path can be based on at least one of the following parameters: horizontal launch angle of the ball, vertical launch angle of the ball, ball speed, club head speed, dynamic loft, club face-to-path angle, and club face angle. This extrapolated path provides the basis for generating instructions for the camera to move to stay on (or ahead of) the ball until further data is provided by the ball tracking algorithm, e.g., sending 180 signals to one or more motors 135 of the camera 130 to change one or more of pan, tilt, zoom, focus, and iris of the camera 130.

Once a trajectory of the ball is determined by the ball tracking algorithm, the control of the camera is modified 190 (e.g., by computer 120, computer 122, or both) to adjust one or more of the camera settings based on the determined trajectory of the ball. The trajectory of the ball corresponds to the arc of the ball in free flight in 3D space. Thus, the determined trajectory provides more accurate information regarding the future position of the ball, and signals can thus be sent 190 to the one or more motors 135 of the camera 130 to change one or more of pan, tilt, zoom, focus, and iris of the camera 130, i.e., physical camera control, in view of this more accurate understanding of the future position of the ball in flight. Alternatively or additionally, digital processing of image data from a high-resolution camera can be performed 190 to change one or more of pan, tilt, zoom, etc., i.e., virtual camera control.

The accuracy of the probable trajectory of the ball increases as more data is received, and so the camera 130 can be controlled so as to get closer and closer (in terms of zoom) on the ball as more data is received. Given the high zoom capabilities of typical broadcast cameras, this will enable the camera 130 to provide a high quality close up of the ball in flight, without the risk of losing the ball, as can occur with human operation of a broadcast camera. This control is provided using data from at least one separate sensor of the sensor unit(s) 110 because the object will typically move too fast (at least initially) to use imaging data from the camera 130 to track the object while also zooming the camera 130 to provide a close up of the object, e.g., for broadcast.

The use of separate sensor unit(s) 110 can provide technical advantages in that substantial flexibility is provided in terms of the sensor technology used and the location(s) of the sensor unit(s) 110, which can be a significant factor for a given area. For example, in view of the particular layout of a golf course hole, one or more stereo cameras 110 with a wide field of view can be place at the tee, at a first location along the fairway and at the green, while a broadcast camera 130 can be placed at a second location along the fairway. Moreover, the camera 130 can be controlled to stay on (or ahead of) the ball until it lands, and the camera 130 be controlled to provide a smooth and slight zoom out as the ball approaches the ground, based on the projected speed and direction of the ball in combination with the angle between the ball trajectory and the center line of the camera 130, such that the ball bounce will be fully viewable in the zoomed-in field of view of the camera 130.

Figure 2:
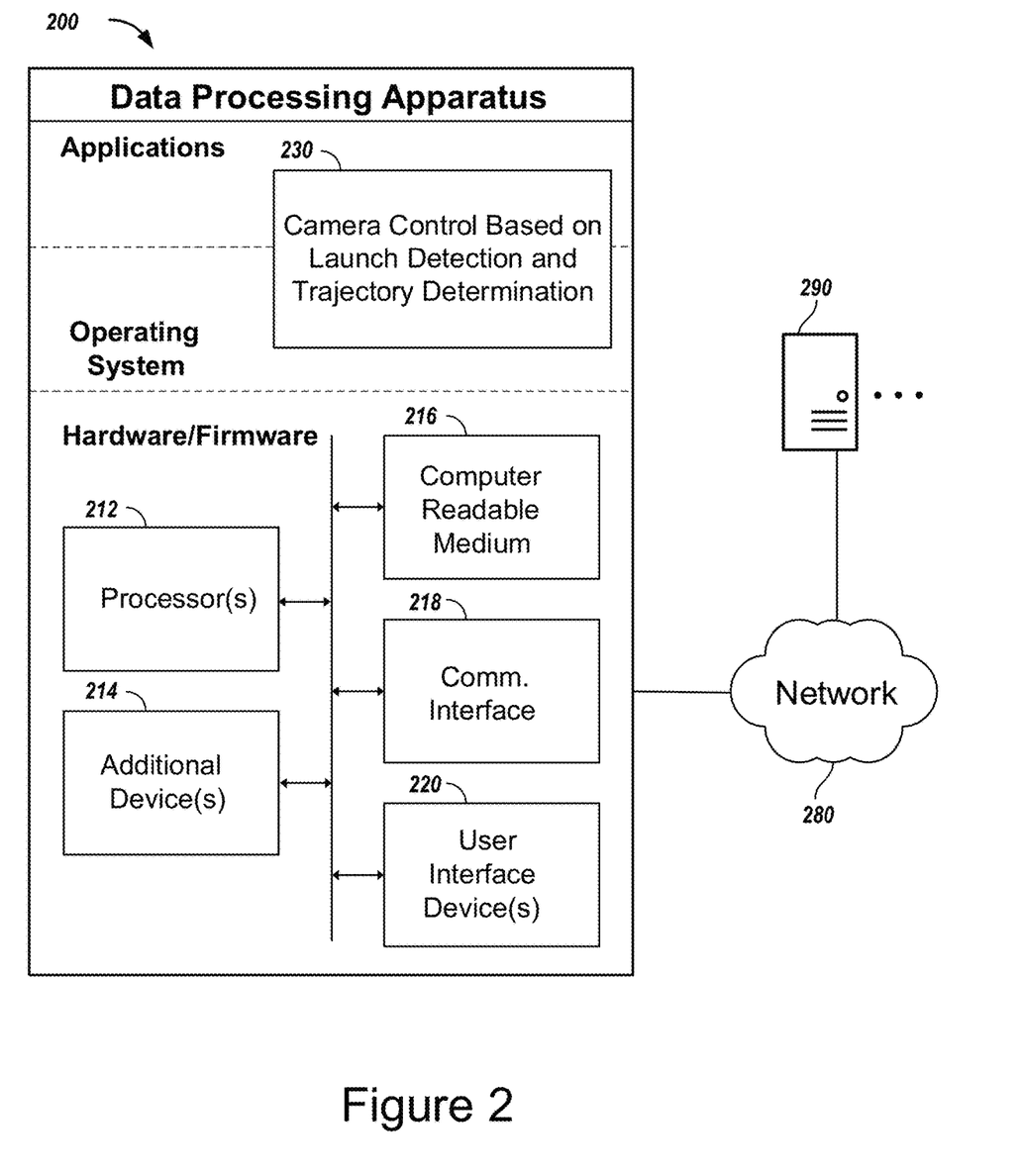
FIG. 2 is a schematic diagram of a data processing system including a data processing apparatus.

Various types of computers can be used in the system. The essential elements of a computer are a processor for performing instructions and one or more memory devices for storing instructions and data. As used herein, a "computer" can include a server computer, a client computer, a personal computer, embedded programmable circuitry, or a special purpose logic circuitry. FIG. 2 is a schematic diagram of a data processing system including a data processing apparatus 200, which represents an implementation of computers 120, 122. The data processing apparatus 200 can be connected with one or more computers 290 through a network 280.

The data processing apparatus 200 can include various software modules, which can be distributed between an applications layer and an operating system. These can include executable and/or interpretable software programs or libraries, including a program 230 that controls camera 130, as described in this document. The number of software modules used can vary from one implementation to another. Also, in some cases, the program 230 can be implemented in embedded firmware and/or as software modules that are distributed on one or more data processing apparatus connected by one or more computer networks or other suitable communication networks.

The data processing apparatus 200 can include hardware or firmware devices including one or more hardware processors 212, one or more additional devices 214, a non-transitory computer readable medium 216, a communication interface 218, and one or more user interface devices 220.

The processor 212 is capable of processing instructions for execution within the data processing apparatus 200, such as instructions stored on the non-transitory computer readable medium 216, which can include a storage device such as one of the additional devices 214. In some implementations, the processor 212 is a single or multi-core processor, or two or more central processing units (CPUs). The data processing apparatus 200 uses its communication interface 218 to communicate with one or more computers 290, for example, over the network 280. Thus, in various implementations, the processes described can be run in parallel or serially, on a single or multi-core computing machine, and/or on a computer cluster/cloud, etc.

Examples of user interface devices 220 include a display, a touchscreen display, a speaker, a microphone, a tactile feedback device, a keyboard, and a mouse. The data processing apparatus 200 can store instructions that implement operations as described in this document, for example, on the non-transitory computer readable medium 216, which can include one or more additional devices 214, for example, one or more of a floppy disk device, a hard disk device, an optical disk device, a tape device, and a solid state memory device (e.g., a RAM drive). Moreover, the instructions that implement the operations described in this document can be downloaded to the non-transitory computer readable medium 216 over the network 280 from one or more computers 290 (e.g., from the cloud), and in some implementations, the RAM drive is a volatile memory device to which the instructions are downloaded each time the computer is turned on.

Figure 3:
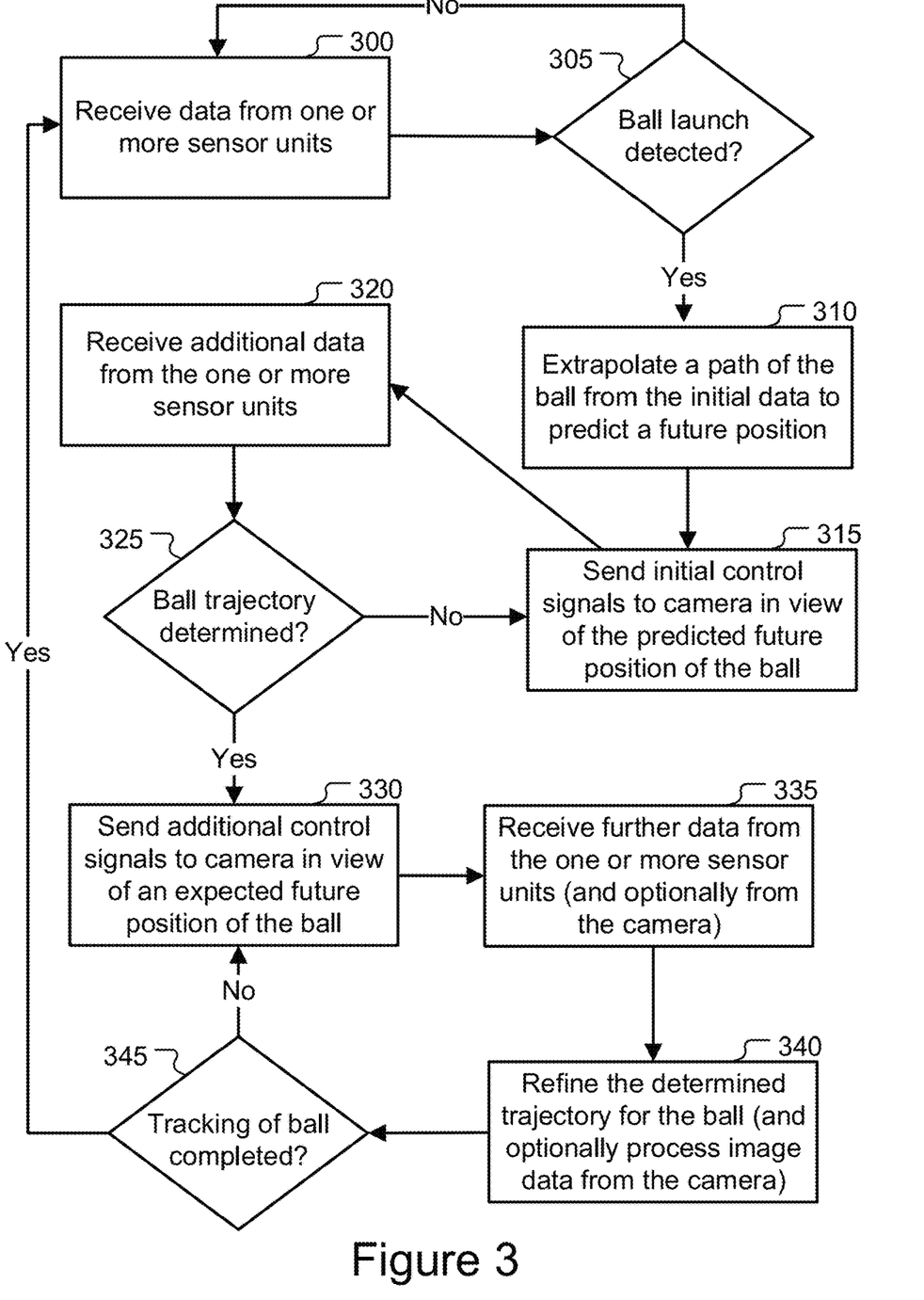
FIG. 3 shows another example of a process of controlling a camera based on launch detection and trajectory determination.

FIG. 3 shows another example of a process of controlling a camera based on launch detection and trajectory determination. Data from one or more sensor units is received 300 (e.g., by data processing apparatus 120, 122, 200, 290). A check is made to determine 305 (e.g., by data processing apparatus 120, 122, 200, 290) if a ball (e.g., a golf ball) has been launched. When a ball launch is detected 305 (e.g., by data processing apparatus 120, 122, 200, 290) a path of the ball can be extrapolated 310 (e.g., by data processing apparatus 120, 122, 200, 290) from the initial data to predict a future position of the ball. In other words, a very rough initial prediction of the object trajectory can be made immediately after launch based on one or more initially detected aspects of the object launch, such as horizontal launch angle of the ball, vertical launch angle of the ball, ball speed, club head speed, dynamic loft, club face-to-path angle, and club face angle.

Initial control signals are sent 315 (e.g., by data processing apparatus 120, 122, 200, 290) to the camera in view of the predicted future position of the ball. The control signals for pan, tilt, focal length, focus, and iris can be sent to the various motors of the camera as appropriate for the camera, such as via a serial port using RS232 or RS422 protocols, via a network or NFC channel (e.g., using Ethernet, WiFi, or Cellular phone communication protocols), via an API provided by the camera manufacturer, and/or via customized software designed to communicate with the motors of the camera over the camera manufacturer's communication protocol. Thus, a broadcast camera can be caused to start moving in the correct direction before the sensor system has even detected a track of the ball in flight, let alone started fully tracking the ball and constructing a predicted trajectory.

The relative positions of the camera 130 and the sensor unit(s) 110 in 3D space should be known for the current system configuration. In some implementations, the camera 130 is calibrated into the same 3D coordinate space as the sensor unit(s) 110 of the tracking system, such as using laser or global positioning system (GPS) based calibration systems and techniques. The control process for the camera 130 can have an initial "origin", which can include the direction (pan and tilt) as well as fixed levels for zoom and focus. The origin is where the shot will originate from and can be the tee or any suitable point along the fairway. For example, using 3D coordinates of golf balls received from a ball locating system, such as SHOTLINK, which is provided by the PGA TOUR, the tracking system and the robotic camera can be ensured to operate in the same coordinate space and thus ensure the broadcast camera 130 has its initial view on the golfer wherever he or she may be on the course.

Additional data is received 320 (e.g., by data processing apparatus 120, 122, 200, 290) from the one or more sensor units. A check is made to identify 325 (e.g., by data processing apparatus 120, 122, 200, 290) when a ball trajectory has been determined. While a ball trajectory has not been determined 325, the initial control signals can continue to be sent 315 to the motors of the camera in view of the predicted path of the ball and the elapsed time since ball launch.

Once a trajectory has been determined 325 (e.g., by data processing apparatus 120, 122, 200, 290) for the ball, additional control signals are sent 330 (e.g., by data processing apparatus 120, 122, 200, 290) to the camera in view of an expected future position of the ball, as determined from the ball trajectory. The control signals that are sent to the camera's motors can be tailored to provide smooth operation of the camera while the camera stays on (or ahead of) the ball, e.g., using a camera operations model that is defined in accordance with the determined (and refined) trajectory. For example, one or more splines can be produced based on future estimations of where the ball should be, and the control signals can be determined in accordance with such spline(s) to keep the camera ahead of the ball and prevent camera movements from being jerky. The splines can be created for a number of parameters, including pan, tilt, zoom, focus, and/or iris. In some implementations, iris is controlled automatically by the camera (without regard to the projected future position) but this automatic control can be overridden in situations where the predicted trajectory warrants this. Likewise, in some implementations, the camera's autofocus is used, but this will depend on the camera being used and the effectiveness of its autofocus control; in some cases, controlling focus using the projected future position of the ball is preferable since this can provide better results, and in live sporting events, there is no opportunity to "retake" a scene. Note however that the "determined" trajectory is unlikely to be 100% accurate, at least initially. Rather, the sensor system can predict the likely trajectory in real-time, and this predictive data is used control the camera before there is certainty for the trajectory.

Thus, further data can be received 335 (e.g., by data processing apparatus 120, 122, 200, 290) from the one or more sensor units, and the determined trajectory for the ball can be refined 340 (e.g., by data processing apparatus 120, 122, 200, 290). While the ball tracking continues 345 (e.g., by data processing apparatus 120, 122, 200, 290) additional control signals are sent 330 to the camera in view of the expected future position of the ball, e.g., the spline(s) can be updated in an ongoing manner using the refined trajectory, while the control signals continue to be determined based on the spine(s). Moreover, as more data is received, the accuracy of the predicted trajectory increases, and so the camera can be controlled to zoom in closer and closer as time goes on. Thus, the camera automatically stays on (or ahead of) the ball through its entire trajectory, including potentially one or more bounces, until the ball comes to a stop.

In some implementations, image data can also be received 335 (e.g., by data processing apparatus 120, 122, 200, 290) from the broadcast camera 130, and this image data can be processed 340 (e.g., by data processing apparatus 120, 122, 200, 290) to identify the ball in the image data. Once the ball is identified in the image data, further control signals can be sent 330 to the camera so as to cause the motors 135 of the camera 130 to adjust each of the pan, tilt, and zoom (and optionally other parameters/settings) for the camera to stay on (or ahead of) the ball in real-time. For example, the initial ball path and the tracked ball trajectory can be used iteratively to produce a more-and-more accurate model of the path of the ball in 3D space, which the camera is directed to follow (ahead of the ball) and zoom in towards, until the ball is clearly visible in the view of the camera. At that point, image processing on the broadcast camera images themselves can be used to supplement the ball flight tracking algorithm with real-time data from the broadcast camera.

As noted above, the ball will likely move too fast (at least initially) to use imaging data from the camera 130 to track the object while also zooming the camera 130 to provide a close up of the ball, e.g., for broadcast. But after a certain period of time, the camera 130 will be moving with the ball such that motion blur is reduced, and imaging data from the camera 130 can be used to further refine the camera operations model to always keep the ball within the camera's frame. For example, each individual frame in a collection of frames can be analyzed to detect the ball using machine learning or computer vision algorithms, and to detect the movement between the consecutive frames. The collection of (e.g., fixed size) frames can be "sliding", such that for each new consecutive frame inserted into the system, the oldest frame is also removed. Then the algorithm(s) can run again to build up a model of how the ball is moving in the broadcast frame. With such additional data input, the camera settings can be adjusted to keep the ball in the center of the camera's frame based on how the ball is moving in the image.

Moreover, if the ball somehow gets out of the frame, the camera 130 can be controlled to zoom out (while continuing to move along the predicted trajectory) until the ball is detected in the frame of the camera 130 again. Also, upon impact with the ground, the processed image data from the camera 130 can be used to keep the ball in the camera frame while the ball bounces and rolls, even if the sensor unit(s) 110 stop tracking the ball. When the ball either stops or the camera 130 loses vision of the ball, e.g., after a certain timeout, the camera can be controlled to zoom out to display more of the resting location for the ball e.g., to show a broader view of the golf hole, thus visualizing for viewers where the ball is located in relation to the pin, the shape of the hole, etc.

In some implementations, the amount of zoom can also be controlled based on an amount of ball bounce, which can be determined as the ball impacts an object and ball observations by the sensor unit(s) 110 indicate the actual amount of ball bounce. In some cases, the amount of ball bounce can be predicted ahead of the bounce based on the predicted trajectory (by the tracking system using the sensor unit(s)) and a prediction of where the ball will impact some other object. For example, machine learning based algorithms can be trained to classify trees and bunkers (and optionally other objects, such as other objects typically found on a golf course) and their positions within the 3D coordinate system can be estimated and provided for use in predicting impacts and ball bounce amounts.

In addition, while the focus of this disclosure is golf, the systems and techniques described are also applicable to other sports, such as baseball, cricket, football/soccer, American football, etc. Thus, the camera control can be based on predictions of other types of impacts of a ball with various types of objects in the world. For example, the system can predict a ball's impact with a base, a player, or a location that is out of bounds (e.g., a home run prediction) and the camera can be controlled based on this prediction. In some implementations, one or more image tracking algorithms can be used to track players on a field (e.g., players on a baseball field) and predictions can be made regarding where the players are headed in relation to the ball's predicted trajectory, in order to predict an impact. Moreover, various types of radar device can be used, including Doppler radar, phased array radar, Continuous Wave (CW), and/or Frequency Modulated Continuous Wave (FMCW) radar devices, to determine radial speed, distance, and direction of a tracked object to create a three-dimensional trajectory which can be used in a robotic camera control model using the systems and techniques described in this specification.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The non-transitory computer-readable medium can be a manufactured product, such as hard drive in a computer system or an optical disc sold through retail channels, or an embedded system. The non-transitory computer-readable medium can be acquired separately and later encoded with the one or more modules of computer program instructions, such as by delivery of the one or more modules of computer program instructions over a wired or wireless network. The non-transitory computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and one or more processors of any suitable kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROM and DVD-ROM disks; network attached storage; and various forms of cloud storage. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be sensory feedback, e.g., visual feedback, auditory feedback, or tactile feedback; and input from the user can be received in various forms, including acoustic, speech, or tactile input.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the description above focuses on tracking the motion of a golf ball, but the systems and techniques described are also applicable to other types of object motion tracking, such as for baseball or skeet shooting, as well as non-sports applications. Further, tracking an object "in motion" can include tracking the object when it bounces off and/or rolls along the ground, in some implementations.

Finally, the focus of the present disclosure is on controlling movement of a physical camera, but the systems and techniques described are also applicable to controlling one or more virtual cameras. For example, typical high definition (HD) broadcast cameras have 1080×1920 pixels of resolution, but higher resolution cameras are currently available and will continue to become available in the future, such as 4K, 8K, 12K, etc. resolution cameras. Using such a higher resolution camera at an event, virtual pan/tilt/zoom effects can be created within the larger frame provided by the higher resolution camera. Thus, the systems and techniques described in this application can also be used to control camera "moves" that are in this virtual space of the higher resolution camera's 2D image frame, including slides along the horizontal and vertical axes of the camera frame and zooming, as well as transforming the perspective in the image so that a "slide" has a pan-like effect instead. Therefore, the predictive camera control can include virtually zooming, panning and tilting the broadcast image to show more of the landing location (e.g., the golf green) and/or the final resting location while the physical camera itself does not move. Likewise, image data from such a high resolution camera 130 can also be used in combination with data from at least one separate sensor of the sensor unit(s) 110 to track the object in 3D space, as described above.

What is claimed is:

1. A system comprising:
   a first sub-system comprising a camera and motors configured and arranged to adjust pan, tilt, and zoom for the camera; and
   a second sub-system comprising one or more sensors and one or more data processing apparatus configured to
      detect a launch of a ball based on initial data obtained by the one or more sensors,
      send initial control signals that cause at least one of the motors of the first sub-system to begin changing at least one of pan, tilt, or zoom for the camera based on a predicted future position of the ball,
      determine a trajectory of the ball in three-dimensional space based on additional data obtained by the one or more sensors after the launch, and
      send additional control signals that cause the motors of the first sub-system to control each of the pan, tilt, and zoom for the camera based on an expected future position of the ball along the trajectory.

2. The system of claim 1, wherein the one or more data processing apparatus of the second sub-system are configured to:
   extrapolate a path of the ball based on the initial data to predict the future position of the ball after the launch.

3. The system of claim 2, wherein the camera of the first sub-system is a broadcast camera, the motors of the first sub-system comprise an actuator configured and arranged to adjust focus for the camera, and the one or more data processing apparatus of the second sub-system are configured to:
   send further control signals that cause the actuator of the first sub-system to control the focus for the camera based on a current position of the ball along the trajectory.

4. The system of claim 3, wherein the one or more data processing apparatus of the second sub-system are configured to:
   process image data from the broadcast camera to identify the ball in the image data; and
   send further control signals that cause the motors of the first sub-system to control each of the pan, tilt, and zoom for the camera to stay on the ball in real-time based on the ball being identified in the processed image data from the broadcast camera.

5. The system of claim 1, wherein the one or more sensors of the second sub-system comprise a radar device.

6. The system of claim 1, wherein the one or more sensors of the second sub-system comprise a stereo camera.

7. The system of claim 1, wherein the one or more sensors of the second sub-system comprise a radar device and a camera.

8. The system of claim 1, wherein the second sub-system comprises a launch monitor that provides the initial data and a ball tracker that provides the additional data.

9. The system of claim 1, wherein the ball is a golf ball.

10. The system of claim 1, wherein the ball is a baseball.

11. The system of claim 1, wherein the first sub-system is separate and distinct from the second sub-system.

12. The system of claim 1, wherein the one or more sensors of the second sub-system comprise two sensors, which include the camera of the first sub-system.

13. A method comprising:
   detecting a launch of a ball based on initial data obtained by one or more sensors;
   sending initial control signals that change at least one of pan, tilt, or zoom for a camera based on a predicted future position of the ball;
   determining a trajectory of the ball in three-dimensional space based on additional data obtained by the one or more sensors after the launch; and
   sending additional control signals that control each of the pan, tilt, and zoom for the camera based on an expected future position of the ball along the trajectory.

14. The method of claim 13, comprising extrapolating a path of the ball based on the initial data to predict the future position of the ball after the launch.

15. The method of claim 14, wherein the camera is a broadcast camera, the pan, tilt, and zoom for the camera are physical pan, tilt, and zoom controlled by one or more motors comprising an actuator configured and arranged to adjust focus for the camera, and the method comprises sending further control signals that cause the actuator to control the focus for the camera based on a current position of the ball along the trajectory.

16. The method of claim 14, wherein the camera is a broadcast camera, and the method comprises:
   processing image data from the broadcast camera to identify the ball in the image data; and
   sending further control signals that control each of the pan, tilt, and zoom for the camera to stay on the ball in real-time based on the ball being identified in the processed image data from the broadcast camera.

17. The method of claim 14, wherein the camera is a high resolution broadcast camera, and the pan, tilt, and zoom for the camera are virtual pan, tilt, and zoom.

18. The method of claim 14, wherein the ball is a golf ball.

19. A non-transitory computer-readable medium tangibly encoding a computer program operable to cause data processing apparatus to perform operations comprising:
   detecting a launch of a ball based on initial data obtained by one or more sensors;
   sending initial control signals that change at least one of pan, tilt, or zoom for a camera based on a predicted future position of the ball;
   determining a trajectory of the ball in three-dimensional space based on additional data obtained by the one or more sensors after the launch; and
   sending additional control signals that control each of the pan, tilt, and zoom for the camera based on an expected future position of the ball along the trajectory.

20. The non-transitory computer-readable medium of claim 19, wherein the operations comprise extrapolating a path of the ball based on the initial data to predict the future position of the ball after the launch.

21. The non-transitory computer-readable medium of claim 19, wherein the camera is a broadcast camera, the pan, tilt, and zoom for the camera are physical pan, tilt, and zoom controlled by one or more motors comprising an actuator configured and arranged to adjust focus for the camera, and the operations comprise sending further control signals that cause the actuator to control the focus for the camera based on a current position of the ball along the trajectory.

22. The non-transitory computer-readable medium of claim 19, wherein the camera is a broadcast camera, and the operations comprise:
   processing image data from the broadcast camera to identify the ball in the image data; and
   sending further control signals that control each of the pan, tilt, and zoom for the camera to stay on the ball in real-time based on the ball being identified in the processed image data from the broadcast camera.

23. The non-transitory computer-readable medium of claim 19, wherein the camera is a high resolution broadcast camera, and the pan, tilt, and zoom for the camera are virtual pan, tilt, and zoom.

24. The non-transitory computer-readable medium of claim 19, wherein the ball is a golf ball.

* * * * *